(12) United States Patent (10) Patent No.: US 9,174,865 B2
Bleggi (45) Date of Patent: Nov. 3, 2015

(54) LEACHATE TREATING SYSTEM HAVING SETTLING SPHERES AND METHOD FOR SAME

(71) Applicant: Nicola T. Bleggi, Livonia, MI (US)

(72) Inventor: Nicola T. Bleggi, Livonia, MI (US)

(73) Assignee: Nicola T. Bleggi, Livonia, MI (US)

( * ) Notice: Subject to any disclaimer, the term of this patent is extended or adjusted under 35 U.S.C. 154(b) by 0 days.

(21) Appl. No.: 14/470,468

(22) Filed: Aug. 27, 2014

(65) Prior Publication Data

US 2015/0060358 A1 Mar. 5, 2015

Related U.S. Application Data

(60) Provisional application No. 61/871,038, filed on Aug. 28, 2013.

(51) Int. Cl.
*C02F 9/00* (2006.01)
*C02F 1/48* (2006.01)
*C02F 1/56* (2006.01)
*C02F 1/00* (2006.01)
*C02F 1/52* (2006.01)
*C02F 3/12* (2006.01)
*C02F 103/06* (2006.01)

(52) U.S. Cl.
CPC . *C02F 9/00* (2013.01); *C02F 1/488* (2013.01); *C02F 1/5281* (2013.01); *C02F 1/56* (2013.01); *C02F 3/1236* (2013.01); *C02F 2001/007* (2013.01); *C02F 2103/06* (2013.01)

(58) Field of Classification Search
CPC .............. C02F 9/00; C02F 1/488; C02F 1/56; C02F 2103/06; C02F 1/5281; C02F 3/1236; C02F 2001/007
See application file for complete search history.

(56) References Cited

U.S. PATENT DOCUMENTS

2007/0039894 A1* 2/2007 Cort .............................. 210/695

* cited by examiner

*Primary Examiner* — David A Reifsnyder (57) ABSTRACT

A flash flocculation tank system having a plurality of tanks and a plurality of settling spheres that are magnetic and treat wastewater and/or landfill leachate and a process for decreasing the amount of time for settling solids in biologically and/or chemically treated wastewater and/or landfill leachate. The plurality of settling spheres each have a rare earth magnet and are calibrated by weight to float, sink, and to be suspending in the treated water or leachate. Insoluble waste solids gain a ferromagnetic quality after attaching to the settling spheres. The flash flocculation tank system with the settling spheres and process improve the settleability rate of the insoluble solids of the treated leachate and also allow for a smaller settling tank.

20 Claims, 3 Drawing Sheets

LEACHATE TREATING SYSTEM HAVING SETTLING SPHERES AND METHOD FOR SAME

CROSS-REFERENCE TO RELATED APPLICATIONS

This application claims the benefit of U.S. Provisional Application No. 61/871,038, filed Aug. 28, 2013. The disclosure of the above application is incorporated herein by reference.

FIELD OF THE INVENTION

The present invention relates to settling spheres and a flash flocculation tank system for treating wastewater and/or landfill leachate and method for treating wastewater and/or landfill leachate.

BACKGROUND OF THE INVENTION

Wastewater and landfill leachate has been managed and controlled for decades to reduce and help prevent contamination of surrounding soils, waterways, and underground aquifers. Landfills are generally built away from natural habitat and where there is not an underground water source, and are used to discard solid waste materials, including old televisions, computers, telephones, paint cans, motor oil, batteries, electronic devices, and countless other waste materials and substances which are not degradable or recyclable, by burying them in layers in the soil. Besides large economic advantages to be gained, e.g., including from international and municipal sources or entities paying for waste disposal, landfills help minimize environmental harm from these solid wastes and allow waste to decompose under controlled conditions until its eventual transformation into relatively inert, stabilized material.

Landfill leachate is a "toxic soup" of liquid material that drains from a landfill and contains a wide concentration range of undesirable and toxic materials that can be harmful to the environment and health. The leachate consists of many organic and inorganic compounds that may be either dissolved or suspended in the leachate liquid, including, but not limited to, toluene, phenols, benzene, ammonia, dioxins, polychlorinated biphenyls (PCBs), chlorinated pesticides, heavy metals and endocrine-disrupting chemicals. Modern landfills are lined with impermeable layers to prevent leachate from leaking out and contaminating groundwater or surface water of a nearby community. The leachate treatment typically consists of two basic types: biological and physical/chemical. Depending on the treatment goals, sometimes both types are combined. The organic strength of landfill leachate can be greater than 20 to 100 times the strength of raw sewage, which is why the landfills typically have pipes designed to route and collect leachate and have non permeable liners to keep the leachate from contaminating ground water and entering the drinking water in neighborhoods near the landfill.

Landfill leachate is known to be very difficult to treat. One of the main reasons for this is its often changing matrix. The pH can also fluctuate from day-to-day, making it even more difficult to treat. Factors affecting the composition of landfill leachate include: the landfill conditions (climate, pH, temperature, degree of ongoing decomposition, and landfill age); the type of waste discharged to the landfill (biodegradable or non-biodegradable, soluble or insoluble, organic or inorganic, liquid or solid, toxic or nontoxic); the landfill features (size, depth, permeability and soil mineral characteristics under the landfill), and the moisture content of the wastes.

Landfill leachate constitutes a major environmental, economical and social problem worldwide, largely because the waste volume is growing faster than the world's population. Moreover, as stricter environmental requirements are continuously imposed regarding ground and surface waters, the treatment of landfill leachate becomes a major environmental concern.

Magnetic separation for the purpose of cleaning and purifying drinking water is generally known. Also employed is sand clarification for water treatment systems because sand is inexpensive and has a density about two times that of water. This helps to settle the solids of the wastewater, usually in a clarifier. Magnetite, a fully oxidized non-toxic form of iron ($Fe_3O_4$) commonly found in the environment, has become an alternative to sand as the ballast of choice because of its inexpensiveness and its five times greater density than water. The magnetite is also ferromagnetic, allowing it to be recovered by rare earth magnets.

Another known method for treating landfill leachate in a 20 foot shipping container is known. The leachate is collected in an equalization tank which is placed underground and just below the 20 foot shipping container which houses the cleaning system. A biological tank and sedimentation tank are also placed underground. After aerating and biologically treating the raw leachate, the leachate is pumped into a flash flocculation (floc) tank inside the shipping container. Inside the shipping container is the flash floc tank, a magnetic separator, chemical feed pumps and a control panel. In this known method the customer was landlocked and had a very limited space to treat their leachate. The system uses magnetic seeding technology with magnetite as the ballast of choice. The leachate water is treated with coagulants, polymers and magnetite in the flash floc tank and then passed through fifteen magnetic disks. This process is not successful and has many disadvantages. The most difficult problem is the amount of solids and the many different types of solids in the leachate which make it practically impossible to precipitate all of the dissolved ions of the leachate and to allow them to clump or floc on a daily basis.

Another problem with this process is that if the leachate in the biological tank is not allowed enough retention time, for any reason, the raw leachate's buffering capacity is not removed and almost no benefit is gained by the biologically treated leachate. Some days there will be good floc in the flash floc tank, while other days no floc is created. In an attempt to overcome the aforementioned problems in order to treat the customer's leachate in a limited footprint, it is required to pretreat the dissolved ions in solution by removing some of them in a coagulation flocculation and sedimentation tank. By reducing the settling time of the insoluble solids the settling tanks could be reduced in size to fit inside the 20 foot shipping container. Therefore, there are several disadvantages including, but not limited to, increased complexity and steps, costs and processing time.

Accordingly, there exists a need for a leachate treating system and method for treating wastewater and/or landfill leachate that is more efficient and cost effective and allows for the benefit of a smaller processing footprint without limiting treatment effectiveness.

SUMMARY OF THE INVENTION

There is provided a flash flocculation (floc) tank system having settling spheres and a method for treating wastewater and/or landfill leachate. Magnetic settling spheres of the present invention are added to chemically treated wastewater and/or landfill leachate, subsequently speeding up the settling of insoluble solids in a batch process, thereby decreasing the time required for the sedimentation process. The wastewater and landfill leachate is mixed with at least magnetite, polymers, and coagulants. The insoluble solids gain a ferromagnetic quality after attaching to the surface of the settling spheres of the present invention and the settling spheres settle, whereupon the insoluble solids are freed from the surface of the spheres. The increased speed of insoluble solids settling also allows for the use of a smaller processing tank, and subsequently, a smaller footprint at any treatment facility.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Referring to FIGS. 1-7 generally, a settling sphere 1 that is magnetic is provided, in accordance with the present invention. The settling sphere 1 allows at least magnetite 32 and insoluble solids 33 to affix to the surface of the settling sphere 1, as will be described in greater detail below. A plurality of the settling spheres 1 helps to increase the settleability rate of insoluble solids 33 of biologically and chemically treated leachate and allow for a smaller settling tank than that needed to settle insoluble solids using conventional methods. Thus, the size of the settling tank is reduced to a predetermined size operable to fit inside a predetermined shipping container. Magnetite 32 is added to the now smaller clarifier tank, increasing the settling of the insoluble solids 33 significantly.

It is understood that the terms "settling tank", "clarifier tank", "tank" are used interchangeably in the description of the present invention.

Referring more particularly to FIGS. 1-3C, each settling sphere 1 has at least one magnet 35 and a mounting arrangement, shown generally at 37, within an interior cavity 39. The mounting arrangement 37 has a housing 31 sized for holding the magnet 35 within the housing 31. The magnet 35 is a rare earth magnet and is circular. The magnet 35 is secured to the housing 31 by adhesive, e.g., a plurality of drops of a strong glue on the magnets circumferential surface. The magnet 35, and respective housing 31, is any operable predetermined size suitable for increasing the settleability rate of insoluble solids 33 a predetermined amount. Preferably, the magnet is ⅛ inch thick and 1 inch diameter. Most preferably, the magnet is an ⅛ inch thick and 1 inch diameter Neodymium rare earth magnet 35, grade N42.

Figure 1:
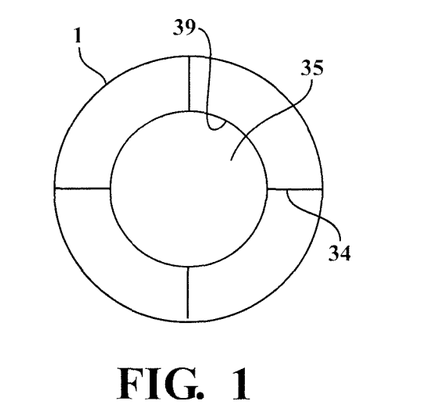
FIG. 1 is a top plan view of a settling sphere interior, in accordance with the present invention.
Figure 2:
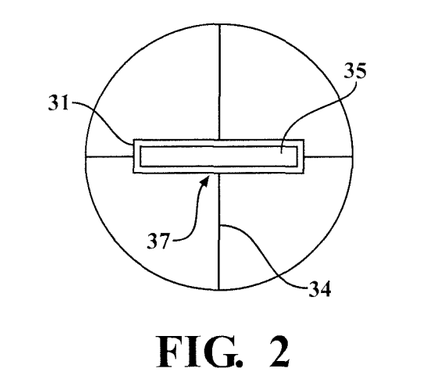
FIG. 2 is a front elevation view of the settling sphere interior of FIG. 1, in accordance with the present invention.
Figure 3A:
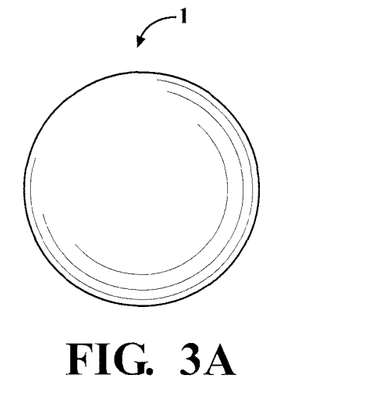
FIG. 3A is a schematic illustration of the settling sphere of FIGS. 1-2 having an outer surface, in accordance with the present invention.
Figure 3B:
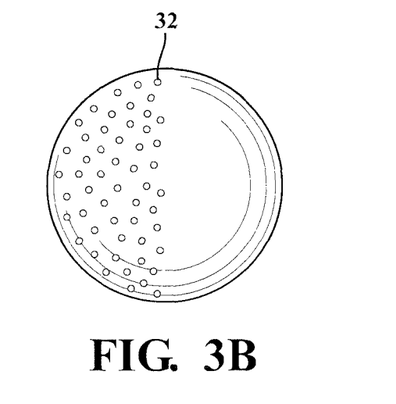
FIG. 3B is a schematic illustration of the settling sphere surface having magnetite affixed to the surface, in accordance with the present invention.
Figure 3C:
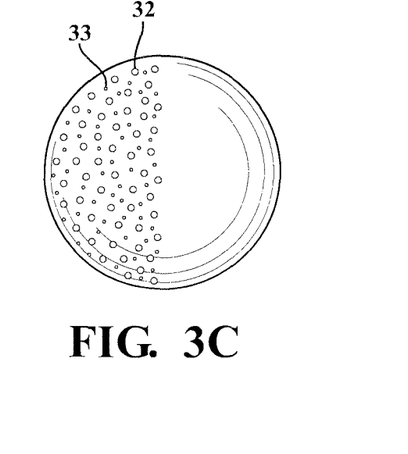
FIG. 3C is a schematic illustration of the settling sphere surface having magnetite and insoluble solids affixed to the surface, in accordance with the present invention.

The magnet 35 is housed in the magnet housing 31 exactly in the center of the settling sphere 1. This allows for substantially all of the outer surface of the settling sphere 1 to become covered with magnetite 32 and solid particles 33. If the magnet 35 is not in the exact center, the magnetite/solid particles 32,33 would still affix to the settling sphere 1, but to one half of its surface instead of its entire surface. The magnetite/solid particles 32,33 would attach to the side where there is more magnetic pull on the settling sphere's 1 surface.

Generally, the plurality of settling spheres 1 are made of a durable plastic material suitable for providing the interior cavity while withstanding predetermined amounts of force and pressure. Typically, the material is urethane, thermoplastic urethane, thermoset, and/or Surlyn™. Other types of plastics and other suitable materials such as foam, rubber, and the like are also contemplated as long as they will float in the surrounding fluid in the settling tank.

Referring to FIGS. 1-7 generally, at a predetermined weight the settling sphere 1 in the leachate water will float, further referred to herein as a "float feature". Optionally, additional weight is added to the settling sphere 1, e.g., to the magnet 35, in a predetermined amount operable to make the settling sphere 1 sink in the leachate water, further referred to herein as a "sink feature". Thus, the predetermined weight will either cause the settling sphere 1 to sink in the leachate water immediately or float, as desired depending on the particular application.

The float feature of the settling sphere 1 is provided so that if just magnetite 32 covers the surface of the sphere 1, the settling sphere 1 will still float. However, if insoluble solids 33 are also affixed to the settling sphere's 1 surface the weight of the settling sphere 1 is increased to cause the density of the sphere 1 to be greater than the leachate water in which it is floating, resulting in the settling spheres 1 beginning and continuing to sink in the settling tank. The sink feature incorporates increasing the weight of the settling sphere's 1 rare earth magnet 35 until its density is greater than the leachate water. Optionally, a fastener 34 is used to allow for simple removal or addition of the weight necessary to increase or decrease the density of the settling spheres 1, thus making them sink or float. By way of non-limiting example, the settling sphere 1 is dividable generally into four segments or into hemispheres and releasably fastened to one another with at least one fastener (e.g., mechanical, snap-fit, tongue and groove, screws, and/or adhesive, or other suitable fasteners for selectively opening and closing the spheres).

The settling sphere 1 weight and arrangement correlate to the particular leachate and desired processing. Suitable features (e.g., weight, magnet material, pull force, etc) are selectively employed/combined and the settling spheres 1 operably calibrated to either be in the "sink" or "float" mode, as desired according to particular applications and processing requirements.

The settling spheres 1 will settle faster when more insoluble solids 33 are attached to each settling sphere 1, thus, when the settling spheres 1 are almost completely saturated with insoluble solids 33 the settling spheres 1 can be returned more quickly to the top of the settling tank. The settling spheres 1 are found generally throughout the settling tank, typically, near the surface, in the middle, and/or at the bottom as settling spheres 1 are settling/rising.

Magnetite 32 is added to the now smaller clarifier tank system, increasing the settling of the insoluble solids 33 significantly. When added to the wastewater and/or leachate containing the insoluble solids 33 the magnetite 32 increases the settleability of the insoluble solids 33 at a faster rate than with conventional methods used for sedimentation, which can take several hours or more in some applications.

In accordance with the present invention, a predetermined amount of at least the plurality of settling spheres 1, e.g., a first plurality of settling spheres 1, the magnetite 32, and also polymer(s) and coagulant(s) are added to the leachate. The settling spheres 1, coagulant(s), polymer(s), magnetite 32 and any desired chemicals suitable for treating leachate are operably fed into at least one tank to speed up the process of treating landfill leachate and/or wastewater leachate. Combining and properly mixing the magnetite 32, polymer(s) and coagulant(s) in the leachate within the tank causes the insoluble solids 33 of the leachate to become ferromagnetic for affixing to the plurality of settling spheres 1 (e.g., See FIG. 3C). This causes the insoluble solids 33 affixed to the settling spheres 1 to sink much faster to the bottom of the settling tank than by conventional methods.

In general, the plurality of settling spheres 1 can have many different shapes, sizes and materials. Typically, the shape, size and material of the settling sphere 1 used for a particular application are substantially uniform. Preferably, the settling spheres 1 are a sphere shape (e.g., see FIGS. 3A-3C). Other preferred shapes include, but are not limited to, cube, oblong, oval, rectangle, square, triangle, and tube. The settling sphere 1 may have one or more bumps, protrusions, extensions or the like on its surface to provide spacing between the spheres 1 when in the mixture with the leachate.

Generally, the settling spheres 1 are each about 1.00 to 2.00 inches in diameter. Typically, the settling spheres 1 are each 1.40 to 1.80 inches in diameter. Preferably, the settling spheres 1 are each 1.50 to 1.75 inches in diameter. Most preferably, the settling spheres 1 are each 1.68 inches in diameter. Other suitable sizes are also contemplated, as long as they fit in the tanks and are able to move around in the tanks, as well as sink and float.

The pull force of the magnet 35, of the grade N42 rare earth magnet, used on the settling sphere 1 is about 59.00 pounds. If two spheres 1 were placed adjacent to one another the distance from the surface of one magnet 35 to the surface of the other magnet is greater than or equal to 1.75 inches. This distance is too far for the adjacent magnets' 35 pull force to attract each other. The distance from the surface of the magnet 35 within the settling sphere 1 to the surface of that settling sphere 1 is suitable to provide a predetermined pull force to attract magnetite 32 and/or solid particles 33. Preferably, the distance from the surface of the magnet 35 within the settling sphere 1 to the surface of that settling sphere 1 is about 0.87 inches and well within the about 1.50 inch maximum distance for the magnets' 35 pull force to attract magnetite 32, or magnetite and solid particles 32,33 to the settling sphere's 1 surface. This ensures the settling spheres 1 will not stick to each other, while still allowing magnetite 32, or magnetite and solid particles 33, that are ferromagnetic to affix to the settling sphere's 1 surface.

Referring to FIGS. 1-7 generally, and more particularly to FIGS. 4-7, there is provided a flash flocculation ("floc") tank system, shown generally at 20, containing the plurality of settling spheres 1, in accordance with the present invention. The processing of wastewater and/or leachate includes providing the flash floc tank system 20 with the plurality of settling spheres 1 having at least one magnet 35 mounted internally and operable for allowing magnetite 32, or magnetite and insoluble solid particles 32,33, that are ferromagnetic to affix to the settling sphere's 1 outer surface. The leachate is first at least aerated and biologically treated. After undergoing aeration and biological treatment, the leachate is pumped into the flash floc tank system 20, e.g., a polypropylene flash floc tank system, which tank system is securely and permanently operably fastened inside a shipping container of predetermined size, most preferably, a 20 foot high cube shipping container.

Figure 4:
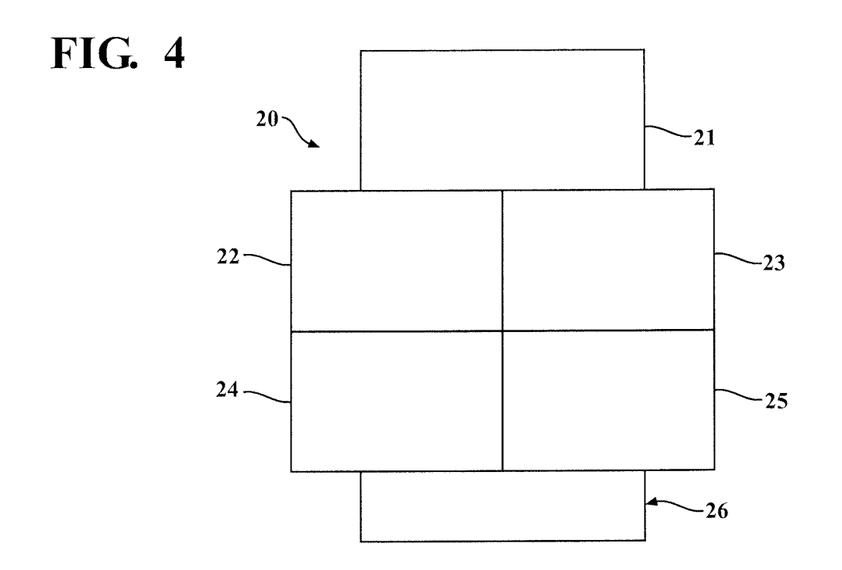
FIG. 4 is a schematic illustration of a flash floc tank system, in accordance with the present invention.

Referring more particularly to FIG. 4, the flash floc tank system 20 has a plurality of tanks. Preferably, at least four tanks. Most preferably, the flash flock tank system 20 has at least six tanks; a first tank 21, second tank 22, third tank 23, fourth tank 24, fifth tank 25, and sixth tank 26, shown generally at 26. The first tank 21 is operably in fluid communication with the second tank 22 and third tank 23. The fourth tank 24 is operably in fluid communication with the second tank 22 and the sixth tank 26. The fifth tank 25 is operably in fluid communication with the third tank 24 and sixth tank 26. In addition, the second and third tanks 22,23 and the fourth and fifth tanks 24,25 are generally arranged side-by-side in two rows between the first tank 21 and the sixth tank 26 within the shipping container.

Preferably, the first tank 21 has a width of 4 feet, length of 2 feet, and height of 4 feet; the second to fifth tanks 22-25 each have a width of 3 feet, length of 4 feet, and height of 4 feet; and the sixth tank 26 has a width of 4 feet, length of 1 foot, and height of 7 feet.

The first tank 21 is provided with a mixing device including a plurality of mixer blades. The aeration and biological treated leachate is operably caused to enter the first tank 21 of the flash floc tank system 20 at a predetermined rate and is immediately treated with a coagulant (e.g., Poly Aluminum Chloride) and a cationic and anionic polymer operably fed into the first tank 21. Generally, the treated leachate enters the first tank 21 at a rate between 150 and 200 gallons per minute (GPM), typically, 165-185 GPM, preferably, 170-180 GPM, most preferably, 176 GPM. The flash floc tank 20 provides thorough mixing of the now chemically treated leachate to help reduce the mostly negative charges of the dissolved solids ions of the leachate. Generally, the mixing time within the first tank 21 is greater than 30 seconds, typically, about 1 minute, preferably, greater than 30 seconds and less than 90 seconds, most preferably, greater than 30 seconds and equal to or less than 1 minute. Thirty seconds is not long enough for the particles to be thoroughly mixed with the chemicals. 90 seconds provides too much mixing since the newly formed floc would be sheared off by the mixer blades in the first tank 21 of the flash floc tank system 20.

The coagulant of choice is poly aluminum chloride (PAC). PAC works optimally in precipitating the dissolved ions solids of the landfill leachate in an environment with a pH of about 7. The cationic and anionic polymers also assist in this. The aforementioned chemicals also help remove the negative charges of the now insoluble solids 33 so that the insoluble solids 33 clump or floc together. The achieved goal is to help precipitate some, but not all, of the dissolved solids 33, so that they settle in the second tank 22 and the third tank 23 after entering from the first tank 21. There are difficulties in treating leachate in one step due to the many different organics and inorganics that leachate contains.

One problem with trying to floc the insoluble solids 33 of the chemically treated leachate in the first tank 21 is that it is very difficult to consistently floc insoluble solids 33 in one step. If the sedimentation tank underground becomes full too quickly due to an increase in water collected in the equalization tank, this usually indicates that the biological and aeration steps did not have enough retention time to treat the leachate and, thus, the leachate that enters the first tank 21 in the flash floc tank system 20 from the sedimentation tank is almost raw leachate.

When the biological, aeration and sedimentation tanks have a predetermined ample time to effectively treat the raw leachate, the floccing of insoluble solids 33 in the second and third tanks 22,23 is possible. When there is not enough retention time in any of the aforementioned tanks, however, then it is very difficult for the coagulant and polymers to be effective in penetrating the buffering capacity of the leachate. As the chemicals help to remove some of the negative charges of the insoluble solids 33 in the chemically treated leachate, the insoluble solids 33 start to move together and clump or floc, as van der Waals forces state that the tendency of particles in nature is to attract each other weakly if they have no electrical charge.

Chemically treated leachate from the first tank 21 enters the second and third tanks 22,23 of the flash floc tank system 20 via a respective influent pipe 7. In the second and third tanks 22,23 the now insoluble solids 33, which have been treated by the chemicals from the first tank 21, stick together. This causes the insoluble solids 33 to begin settling towards the bottom of the respective second and third tanks 22,23. The second and third tanks 22,23 have an operable predetermined amount of magnetite, e.g., about 50 pounds of magnetite 32 ($Fe_3O_4$), constantly in suspension (as do also the fourth and fifth tanks 24,25). This allows for the magnetite 32 to entrap into the leachate and the insoluble solids 33 with the help of the polymers, which act like a glue, e.g., the magnetite entraps into the solids and makes them ferromagnetic due to the polymer and the ferromagnetic solids attach to the settling spheres 1. Some magnetite 32 will get caught up in the insoluble solids 33 without the polymer, while some will get caught in the insoluble solids 33 with the polymer. Magnetite 32 when added to the insoluble solids 33 of the wastewater in a generally quiescent environment increases the settleability of the insoluble solids 33 much faster than with conventional methods. If enough of the magnetite/ferromagnetic solids/polymer particles releasably attach to the settling sphere's 1 surface so that the settling sphere's density 1 is greater than that of the leachate water, the settling spheres 1 will sink.

Therefore, one of the goals is to remove the insoluble solids 33 through coagulation/flocculation and settle them in the second and third tanks 22,23 and to increase the speed at which the insoluble solids 33 settle. To allow the system to effectively treat landfill leachate, and to do this in a very limited footprint, it is paramount that a faster settling of the insoluble solids 33 in the second and third tanks 22,23 as well as the fourth and fifth 24,25 of the flash floc tank system 20 occurs. Magnetite 32 has a specific gravity of 5.6, which is why it is the ballast of choice for this application, in addition to being ferromagnetic and very inexpensive per ton. When magnetite 32 is attached to the insoluble solids 33 in the second through fifth tanks 22-25 of the biologically and chemically treated leachate from the second tank 22, the insoluble solids 33 settle faster than if they were allowed to settle by conventional methods such as gravity alone.

The problem with magnetite 32, however, is that it is much more dense than water, and for this reason, magnetite 32 wants to only sink. Therefore, it would help the settling of solids 33 if more magnetite 32 could come in contact with the insoluble solids 33 of the leachate at the surface of tank, e.g., first tank 21. However, if this is done by a powered agitation system the turbulence created would be too much, and thus, shear the floc or insoluble solids 33 from the magnetite 32. This would remove the ferromagnetic qualities of the insoluble solids 33 that the magnetite 32 provided. Therefore, to promote settling, a predetermined amount of the plurality of settling spheres 1 are operably provided within at least the second and/or third tanks 22,23 as well as the fourth and fifth tanks 24,25.

The plurality of settling spheres 1 are operable to allow the attachment of magnetite 32 to the sphere surface. They also float, returning magnetite 32 from the bottom of the tank, e.g., second tank 22, to the surface of the tank, allowing for maximum contact with the insoluble solids 33. A plurality of layers of magnetite 32 form on the settling spheres' 1 surface, and there is a rather weak bond between the surface of the sphere 1 and the magnetite 32, which allows some of the magnetite 32 to attach to the insoluble solids 33 when they come in contact with each other. Other settling spheres 1 nearby will then attach the magnetite/insoluble solid particles 32,33 to their surface.

Each of the settling spheres 1 releasably affix magnetite/solid particles 32,33 to its surface via the polymer in combination with the magnetic pull of the rare earth magnet 35. Referring to FIGS. 1-7 generally, and more particularly to FIGS. 4-7, when the settling spheres 1 become saturated with insoluble solids 33 on their surface, or close to saturated, the weight of the insoluble solids 33 on the settling spheres 1 causes the extra weight to overcome the buoyant forces of the settling spheres 1, and using the principles of Archimedes, they sink very fast to the bottom of the tank, e.g., within a few seconds, as illustrated by the downward arrow "2" in FIG. 5. The extra weight on the settling sphere's 1 surface increases its density and causes it to become more dense than the leachate water it is floating in, and thus, the settling sphere 1 begins to sink. The density of the leachate is a function of the dissolved solid concentration in the leachate along with its temperature. The settling spheres 1 are finely tuned to sink or float in the leachate water. The settling spheres 1 achieve this with very little weight gained or lost by the settling spheres 1. Due to the reduction in insoluble solids 33 after processing in the second and third tanks 22,23, in the fourth and fifth tanks, 24,25, the settling spheres 1, e.g., a second plurality of settling spheres 1, used in these tanks are slightly different in their weight adjustment than those in the second and third tanks 22,23. This provides the optimal performance of the settling spheres 1 in the fourth and fifth tanks, 24,25.

Figure 5:
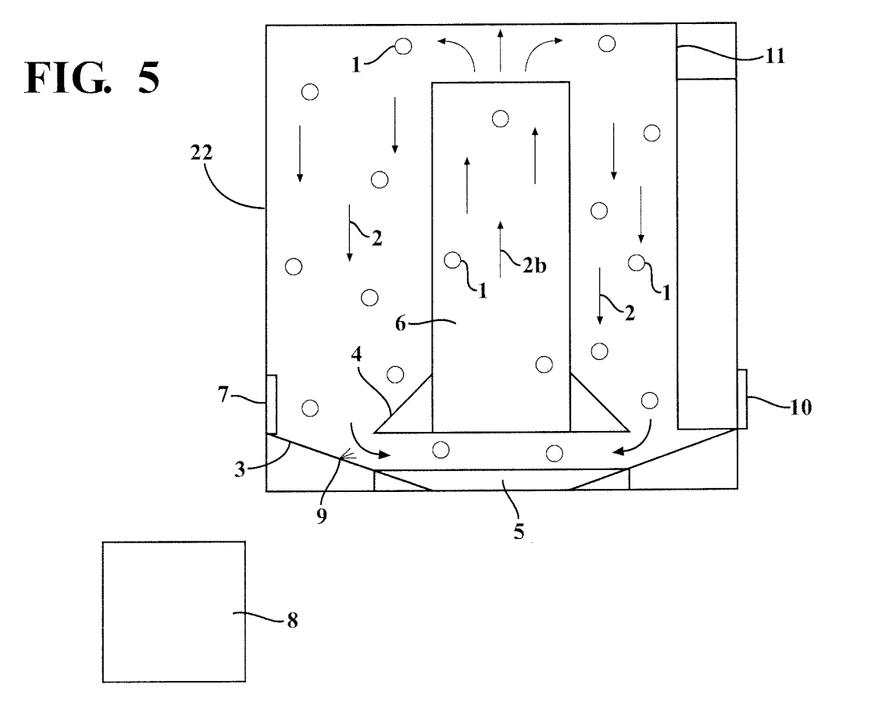
FIG. 5 is a front elevation view of a second tank in the flash floc tank system of FIG. 4, in accordance with the present invention.

Referring to FIGS. 1-7 generally, and more particularly to FIG. 5, the second tank 22 has a fluid medium conduit 6, e.g., a pipe 6, that is vertically positioned and generally centrally located within the tank 22, at least one sludge trough 5 located at the bottom of the tank 22 for removing insoluble solids 33, and at least agitation device, e.g., at least one jet sprayer 9. The third tank 23 is identical to the second tank 22. As the settling spheres 1 settle downward in the second tank 22 they enter an area of the jet sprayer 9, which is operably mounted on an angled portion 3, of the second tank 22 located toward the bottom of the second tank 22. Each of the at least one jet sprayers 9 helps remove the magnetite 32 and insoluble solids 33 from the surface of the settling spheres 1, and break the weak bonds between the magnetite 32 and the insoluble solids 33. The jet sprayer 9 also directs the settling spheres 1 to an area over the sludge trough 5 and under the fluid medium conduit 6, e.g., most preferably, a PVC 14 inch diameter duct pipe 6.

A wedge 4 or ramp, e.g., plastic ramp, is operably connected to the fluid medium conduit 6 to guide the settling spheres 1 downward toward the angled portion 3 where the spheres 1 will come into contact with spray delivered from the at least one jet sprayer 9.

The jet prayer 9 emits a predetermined and specific amount of spray with a predetermined amount of force suitable to remove the insoluble solids 33 from the surface of the settling spheres 1, but not too much to cause excessive agitation in the second tank 22, and thus undesirably break the insoluble solids 33 from the magnetite 32 at the surface or in the middle regions of the second tank 22. The jet sprayer 9 also uniquely direct the settling spheres 1, magnetite 32 and insoluble solids 33 over the sludge trough 5 and under the fluid medium conduit 6 so that the settling spheres 1 can rise up, as indicated by arrows "2b" through a protected pathway provided within the fluid medium conduit 6. The jet sprayer 9 also provides a unique "cloud" near the lower part of the fluid medium conduit 6, consisting of the magnetite 32 and insoluble solids 33, so that the settling spheres 1 can each reattach the magnetite 32 to its surface when the settling spheres 1 return to the upper surface of the tank 22 through the fluid medium conduit 6. By removing the insoluble solids 33 from the surface of the settling spheres 1 the density of the spheres 1 become less than the density of the water such that the settling spheres 1 immediately begin to rise through the fluid medium conduit 6. The height of the fluid medium conduit 6 is preferably 3 feet high.

Most preferably, at least two jet sprayers 9 are located toward the bottom of the second tank 22, each operably mounted to a respective one of angled portions 3, and direct the settling spheres 1 over the sludge trough 5 and toward the open bottom of the fluid medium conduit 6 from opposing directions. The sludge trough 5 is operably in fluid communication with a solids filter press 8.

Alternatively, the fluid medium conduit 6 that the settling spheres 1 rise up in can have an optional attachment of an influent pipe. Instead of rising to the tank 22 surface through the fluid medium conduit 6, the settling spheres 1 are met with a leachate stream, e.g., 176 GPM of leachate, that enters through the side of the fluid medium conduit 6 near its top via the influent pipe, and removes most, if not all, of the magnetite 32 from the settling spheres 1 inside the fluid medium conduit 6 on their way up to the surface of the tank. This would allow for the magnetite 32 to entrap into the insoluble solids 33 at the surface of the tank.

Optionally, the settling spheres 1 are surface coated with a mist or spray of the aforementioned coagulants and polymers as they rise in the fluid medium conduit 6, so that they would provide said chemicals to the surface of the second tank 22. This would provide the necessary chemicals to come in contact with the dissolved ion solids of the leachate and help precipitate them.

The fluid medium conduit 6 provides a more unobstructed pathway for the settling spheres 1 to rise while avoiding most of the settling spheres 1 that are sinking. The predetermined diameter and length of the fluid medium conduit 6 also provides closeness for the settling spheres 1, allowing for maximum saturation of the magnetite 32 cloud produced by the jet sprayer 9. The settling spheres 1 return to the upper surface area of the second tank 22 because they are substantially free of insoluble solids 33 due to the jet sprayer 9. This is a unique feature of the settling spheres 1 in that they will sink or float depending on the amount of insoluble solids 33 releasably affixed on their surface. The settling spheres 1 also re-circulate the magnetite 32 to the surface of the second tank 22 by passing through the cloud of magnetite 32 produced by the jet sprayer 9 when they are rising up through the fluid medium conduit 6 to the tank surface. As the settling spheres 1 reach the top of the fluid medium conduit 6, they position themselves at the surface of the second tank 22 where they begin to repeat the process. The settling spheres 1 will not tire and will be equally efficient for the duration of processing leachate every day/night without interruption.

The insoluble solids 33 released from the settling spheres 1 by the jet sprayer 9 exit the second tank 22 through the sludge trough 5 located below the fluid medium conduit 6 and in the bottom center of the second tank 22. Although it is nearly impossible to prevent some magnetite 32 from also exiting the system through the sludge trough 5, over 99.5% recovery rate of the magnetite 32 is possible. The supernatant then exits out of the second tank 22, e.g., via effluent pipe 10 operably connected to the fourth tank 24, and enters the fourth tank 24 of the flash floc tank system 20. Likewise, the supernatant that exits out of the sludge trough 5 of the third tank 23 enters the fifth tank 25 of the flash floc tank system 20. A mesh netting 11 operably coupled to the effluent pathway and/or effluent pipe 10 prevents settling spheres 1 from escaping the tank.

It is understood that the third tank 23, and correlating process, is identical to the second tank 22 as previously shown and described herein.

In addition, it is understood that the fourth tank 24 and the fifth tank 25 and correlating process are identical to the second tank 22, as previously shown and described, and additionally includes a step of operably feeding chemicals to the fourth and fifth tanks, 24,25 and a step of transferring supernatant from the fourth and fifth tanks 24,25 to the sixth tank 26. In addition, the predetermined amount and features of the plurality of settling spheres 1 may be different, e.g., weight adjusted, due to the reduction in insoluble solids 33 after processing in the second and third tanks 22,23.

Figure 6:
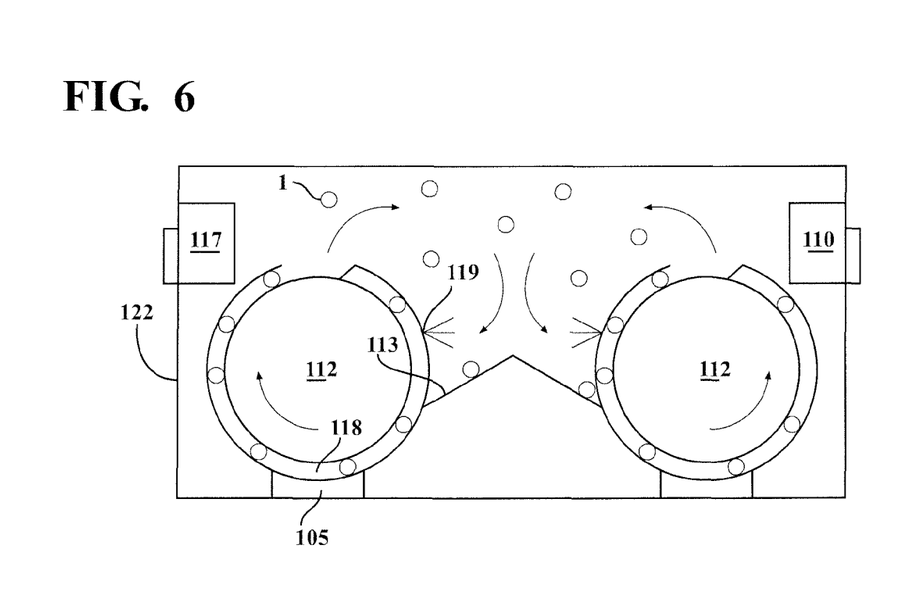
FIG. 6 is a front elevation view of a second tank in a flash floc tank system, in accordance with another embodiment of the present invention.
Figure 7:
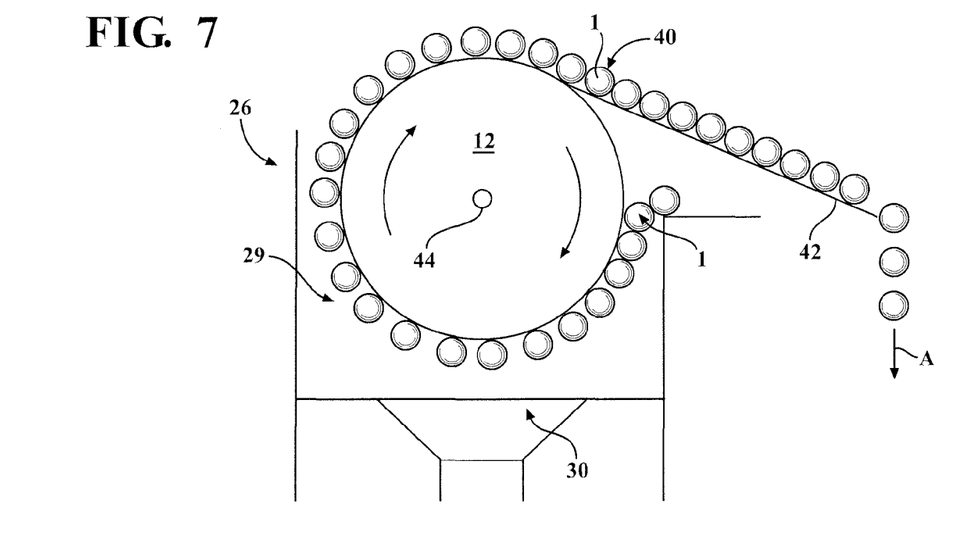
FIG. 7 is a front elevation view of a magnetic drum arrangement of a sixth tank of the flash floc tank system of FIG. 4.

Referring to FIGS. 1-7 generally, and more particularly to FIGS. 5-7, as the supernatant flows out of the second the third tanks 22,23 and enters the fourth and fifth tanks 24,25, respectively, chemicals are operably fed into the fourth and fifth tanks 24,25 operable to precipitate the remaining heavy metal dissolved ions of the supernatant arriving from the second the third tanks 22,23. After processing within the fourth and fifth tanks 24,25 similarly as that set forth previously as to the second tank 22, the settling spheres 1 will exit the respective tanks 24,25 and enter the sixth tank 26.

Two of the three chemicals fed into fourth and fifth tanks 24,25 are the same as those fed into the first tank 21. The chemicals are the cationic and anionic polymers. Unlike the poly aluminum chloride that is fed into the first tank 21, which works better at a pH of 7, sodium aluminate is additionally used, which works best at a pH of 8 to 8.5, as the coagulant of choice for the fourth and fifth tanks 24,25 as it is more specific in precipitating the dissolved ions of the heavy metal insoluble solids 33 left in the supernatant. Some of the dissolved ions of the heavy metal insoluble solids 33 were advantageously left in the solution of the leachate in the second and third tanks 22,23 to make it easier to floc some of them in those tanks. The remaining dissolved ions solids in the supernatant will now be precipitated out in the fourth and fifth tanks 24,25 by the sodium aluminate and the other polymers and will coagulate and floc together. This provides the removal and floccing of the dissolved ions solids in the leachate on a consistent day to day basis.

Referring to FIGS. 1-7 generally, and more particularly to FIG. 7, the settling spheres 1 operably exit the fourth and fifth tanks 24,25, e.g., exit at the top end of the tanks 24,25, toward the sixth tank 26 where they immediately affix to at least one magnetic drum 12 operably coupled to the sixth tank 26. Rare earth metals are preferably used. Most preferably, the magnetic drum 12, e.g., a 14 inch diameter by 2 foot long magnetic drum 12, is operably connected to the top frame portion of the sixth tank 26 by at least two fasteners 44, e.g., two pillow block bearings. A shaft is connected to the magnetic drum 12 and the shaft, e.g., a 1.25 inch diameter stainless steel shaft, is rotatably connected to the at least two fasteners. This allows the magnetic drum 12 to effectively rotate and collect the settling spheres 1 from the fourth and fifth 24,25 tanks and direct them into the sixth tank 26. The magnetic drum 12/shaft may freely rotate as a result of the force of the treated water exiting the fourth and fifth tanks 24,25. Most preferably, an actuator, e.g., with a motor and control unit, is used, operably coupled to the magnetic drum 12 to facilitate rotation at a predetermined speed.

Rotation of the magnetic drum 12, e.g., clockwise rotation, further directs the settling spheres 1 to enter a sink 29, e.g., a 7 inch high sink, of the sixth tank 26 thus recapturing any lost magnetite 32 or magnetite/insoluble solid particles 32,33. The continued rotation of the magnetic drum 12 brings the settling spheres 1 back toward the top of the sixth tank 26. The settling spheres 1 continue to be affixed to the magnetic drum 12 and, as the drum 12 continues its rotation, are rotated to an exiting position, shown generally at 40, e.g., at the 1 o'clock position of the drum 12 and then slide or otherwise traverse along an angled ledge section 42. At the end of the ledge section 42, the settling spheres 1 are operably scraped off of the drum system 12, e.g., by a plastic scraper that is one inch wide and 2 feet in length, and drop (as indicated by arrow "A") or are for operable transfer to the fourth and fifth tanks 24,25 again where they repeat the process.

The sink 29 is in fluid communication with a second pipe 30, e.g., a 6" diameter pipe 30. The effluent exits the sixth tank 26 through the second pipe 30 where it is returned to a nearby pond, lake, etc.

In accordance with another embodiment of the present invention the leachate from the first tank 21 enters the second tank 22; the third tank 23 is eliminated. The aerated and biological treated leachate is operably caused to enter the first tank 21 of the flash floc tank system 20 at a predetermined rate and is immediately treated with a coagulant (e.g., poly aluminum chloride) and a cationic and anionic polymer operably fed into the first tank 21. The leachate is then operably introduced inside the fluid medium conduit 6, e.g., the 14" diameter pipe, of the second tank 22 at a predetermined rate, and thus, the conduit 6 absorbs a lot of the agitation. Generally, the rate is between 150 and 200 gallons per minute (GPM), typically, 165-185 GPM, preferably, 170-180 GPM, most preferably, 176 GPM. Introducing the leachate inside the conduit 6 absorbs a lot of the agitation, which would allow the second tank 22 to settle some of the insoluble solids 33 from the second tank's 22 surface in the predetermined amount of time, e.g., 3-4 minutes, it takes to be filled by the leachate from the first tank 21. This helps to prevent shearing of the insoluble solids 33 from the settling sphere 1 surface. The supernatant then flows to the fourth tank 24 and is processed just like in the second tank 22. The fifth tank 25 is also eliminated and the fourth tank 24 supernatant exits into the sixth tank 26. In summary, the first and sixth tanks 21,26 remain the same, while the third and fifth tanks 23,25 are eliminated. The second and fourth tanks 22,24 treat the leachate as further described previously above.

Referring to FIGS. 1-7 generally, and more particularly to FIG. 6, an exemplary illustration of a process where the settling spheres 1 are set to the "sink" mode will now be described, and incorporates an alternative embodiment that includes at least one drum trough 118 within at least a second tank 122 and/or third tank 123 and at least one drum trough 118 within at least a fourth tank 124 and/or fifth tank 125, where the settling spheres 1 and separated magnetite 32 and insoluble solid particles 33 settle in the direction toward the at least one drum trough 118 located below at least one magnetic drum 112.

The leachate is pumped at a predetermined rate, e.g., rate of 176 GPM, into a first tank 21 (a 2' L×4' W×4' H tank) of the flash floc tank system 20 (having six total tanks) and is thoroughly mixed with poly aluminum chloride (PAC) and an anionic and cationic polymer. The chemicals help to neutralize the negatively charged dissolved ions solids (nonsettleable) so that they precipitate out of solution as insoluble solids 33. The negative charges of the now insoluble solids 33 become neutral and can clump and floc together. The leachate then enters the second tank 122 and/or the third tank 123 of the flash floc tank system 20, e.g., via the influent pipe 117, where it is met with fine granular magnetite particles 32 that are suspended in the leachate along with several hundred Settling spheres 1. The chemically treated leachate of the first tank 21 alternately enters the second tank 122 or the third tank 123, which third tank 123 is similar to the second tank 122, of the flash floc tank system 20, and allows for quiescent time in each tank while the other is filling.

Some of the insoluble solids 33 of the leachate begin to settle in the second tank 122 and/or the third tank 123. The settling spheres 1, while briefly at the surface of the second tank 122 and/or the third tank 123, and with the centrally located rare earth magnetic 35 inside of the settling spheres 1, collect insoluble solids 33 and magnetite particles 32 to their surfaces. Because the additional weight of the insoluble solids 33 and magnetite 32 on the surface of the spheres make the settling spheres 1 more dense than the leachate water they are in, the settling spheres 1 then sink toward the bottom of the second tank 122 and/or the third tank 123.

The settling spheres 1 sink and toward the bottom of the second tank 122 and/or the third tank 123 the settling spheres 1 pass through spray from the jet sprayers 119 of both tanks which remove the insoluble solids 33 and magnetite 32 from the surface of the settling spheres 1. The jet sprayers 119 are operable mounted to the drum troughs 118. At least one ramp 113, e.g., plastic ramp, that is angled an operable amount to help guide the settling spheres 1 to the magnetic drum 112/drum trough 118 area and/or into the spray stream, are each operably mounted to a respective drum trough 118. The now cleaned settling spheres 1 and separated magnetite 32 and insoluble solid particles 33 settle in the direction toward drum troughs 118 located below the magnetic drums 112 (see FIG. 6) in the second tank 122 and/or the third tank 123. The settling spheres 1 and magnetite 32 both will have an affinity to the magnetic drum 112 located adjacent the drum troughs 118, e.g., four inches above the drum troughs 118. Although some magnetite 32 and settling spheres 1 may fall into the drum troughs 118, most will attach to the magnetic drum 12 before reaching the drum troughs 118.

Each drum trough 118 is operably in fluid communication with a respective sludge tank 105. The insoluble solids 33 settle into the drum trough 118 where they eventually exit the sludge tank 118 as sludge. Preferably, at least two magnetic drums 112 are arranged side-by-side each with a respective angled ramp 113 meeting at an apex and each having a respective sludge tank 105.

The rotating magnetic drums 112, with the settling spheres 1 affixed to their surface, guide the settling spheres 1 through the drum troughs 118 to pick up any remaining magnetite 32 and bring the settling spheres 1 and magnetite 32 back to the surface of the second tank 122 and/or the third tank 123, where they are scraped off of the magnetic drums 112. The settling spheres 1, upon reaching the surface of the second tank 122 and/or the third tank 123, repeat the process of collecting more magnetite 32 and insoluble solids 33 on the surface of the settling spheres 1.

The cleaner supernatant of the leachate exits the second tank 122, e.g., via effluent pipe 110 operably connected to a fourth tank 124, and enters the fourth tank 124, while the same happens for the third tank 123, which fills the fifth tank 125 where the supernatant in both the fourth and fifth tanks 124,125 are met by fine magnetite granules 32, anionic and cationic polymers and sodium aluminate. The sodium aluminate is used instead of PAC to help precipitate and floc the heavy metal dissolved ion solids of the supernatant. In addition, a mesh netting 11 operably coupled to the effluent pathway and/or effluent pipe 110 is contemplated, which prevents settling spheres 1 from escaping the second tank 122.

As in the second tank 122 or the third tank 123, the same process will occur in the fourth and fifth tanks 124,125 as the settling spheres 1 collect the magnetite 32 and insoluble solids 33 and settle them to the drum troughs 118 below the magnetic drums 112. It is contemplated that the fluid medium conduit 6 can additionally be employed as described in detail previously.

The treated leachate exits the fourth and fifth tanks 124,125 and enters the sixth tank 26. The settling spheres 1 exit the fourth and fifth tanks 124,125, e.g., at the top end of the fourth and fifth tanks 124,125, where they immediately attach to the magnetic drum 12 which is attached to the top of the sixth tank 26 frame. The clockwise rotating magnetic drum 12 allows for the settling spheres 1 to enter the sink 29, e.g., 7 inch sink, of the sixth tank 26 (see FIG. 7), thus, recapturing any lost magnetite 32 or magnetite/insoluble solid particles 32,33.

The settling spheres 1 on the magnetic drum 12 then rotate to an exiting position 40, e.g., the 1 o'clock position of the drum 12, and are scraped off of the magnetic drum 12 and operably delivered into the fourth and fifth tanks 124,125 again where the process is repeated. The effluent exits the sixth tank 26 through the second pipe 20, e.g., a 6" diameter pipe, where it is returned to a nearby pond, lake, etc.

An exemplary illustration of the process where the settling spheres 1 are set to the "float" mode will now be described. The leachate is pumped at a predetermined rate, e.g., rate of 176 GPM, into the first tank of the flash floc tank system 20 (having six total tanks) and is thoroughly mixed with poly aluminum chloride (PAC) and an anionic and cationic polymer. The chemicals help to neutralize the negatively charged dissolved ions solids (nonsettleable) so that they precipitate out of solution as insoluble solids 33. The negative charges of the now insoluble solids 33 become neutral and allow them to clump and floc together.

The chemically treated leachate then enters the second and/or third tanks 22,23 of the flash floc tank system 20 where it is met with fine granular magnetite particles 32 that are suspended in the leachate along with at least several hundred settling spheres 1. The chemically treated leachate of the first tank 21 alternately enters the second tank 22 or third tank 23 of the flash floc tank system 20, allowing for quiescent time in each tank while the other is filling.

Some of the insoluble solids 33 of the leachate begin to settle in the second tank 22 and third tank 23. In addition, the settling spheres 1, while briefly at the surface of the second tank 22 and third tank 23, and with the centrally located rare earth magnetic 35 inside of the spheres 1, collect insoluble solids 33 and magnetite particles 32 to their surfaces. Because the additional weight of the insoluble solids 33 and magnetite 32 on the settle spheres' 1 surface make the spheres 1 more dense than the leachate water they are in, they then sink toward the bottom of the second tank 22 and third tank 23.

Jet sprayers 9, operably mounted on the angled sides 3 of the second tank 22 and third tank 23, remove the insoluble solids 33 and magnetite 32 off the spheres' 1 surface via agitation. The insoluble solids 33 and magnetite particles 32 are now removed from the settling spheres 1 and the bonds between the insoluble solids 33 and magnetite 32 are broken. The insoluble solids 33, magnetite 32 and settling spheres 1 are strategically directed over the sludge trough 5 by the spray from the jet sprayers 9. The settling spheres 1 reattach just magnetite 32 to their surfaces and rise through the fluid medium conduit 6, PVC duct pipe. This helps to return the magnetite 32 to the surface of the second tank 22 and third tank 23.

Alternatively, the leachate is delivered at a predetermined rate, e.g., rate of 176 GPM, into the fluid medium conduit 6 in which the settling spheres 1 rise to the surface of the second and third tanks 22,23, with the purpose of removing the magnetite 32 off of the settling spheres 1 via pressure, and delivering the magnetite 32 back to the surface of the second and third tanks 22,23. Alternatively, the insoluble solids 33 settle into the drum trough 18, as set forth previously, where they eventually exit the second and third tanks 22,23 via the respective sludge tank 105 as sludge. The settling spheres 1, upon reaching the surface of the second and third tanks 22,23 via the magnetic drum 12, repeat the process of collecting more magnetite 32 and solids 33 on their surfaces.

The cleaner supernatant of the leachate exits the second and third tanks 22,23 and enters the fourth and fifth tanks 24,25 where it is met by anionic and cationic polymers and sodium aluminate, which is used instead of poly aluminum chloride to help precipitate and floc the heavy metal insoluble solids 33. As in the second and third tanks 22,23, the same process will occur in the fourth and fifth tanks 24,25, as the settling spheres 1 collect the magnetite 32 and insoluble solids 33. Alternatively, the settling spheres 1 collect the magnetite 32 and insoluble solids 33 and settle them to the drum troughs 18 below the magnetic drums 12.

The treated leachate exits the fourth and fifth tanks 24,25 and enters the sixth tank 26. The settling spheres 1 exit the fourth and fifth tanks 24,25 at the top ends of the fourth and fifth tanks 24,25 where the settling spheres 1 immediately attach to the magnetic drum 12 which is operably connected to the top of the sixth tank 26 frame.

The rotation, e.g., clockwise rotating, of the magnetic drum 12 allows for the settling spheres 1 to enter the sink 29 (e.g., 7 inch high, 1 foot long, and 2 foot wide sink), (see FIG. 7), thus, recapturing any lost magnetite 32 or magnetite/insoluble solid particles 32,33. The settling spheres 1 then rotate to the exiting position 40, e.g., the 1 o'clock position of the magnetic drum 12, and are operably scraped off of the magnetic drum 12, e.g., of the end of the ramp portion 42, and are operably fed to the fourth and fifth tanks 24,25, where they repeat the process continuously. The effluent exits the sixth tank 26 through the second pipe 30, a 6" diameter pipe, where it is returned to a nearby pond, lake, etc.

It is understood that the settling spheres 1 help settle faster than the insoluble solids 33 of the wastewater or the like alone. The spheres can travel almost anywhere in the tank or the like, e.g., tank(s) 22, 23, 24, 25 and/or 26, to capture the ferromagnetic solids 33 onto their surface. Because the magnetite 32 has a specific gravity near 5, it has a tendency to sink very fast and the feature of the spheres being able to cover almost any area in the tank helps to remove the ferromagnetic solids before they settle in the tank, for example, in the corners or in hard to reach places.

The settling spheres help remove the insoluble solids from the wastewater or the like by collecting the solids on their surface and then the ferromagnetic solids are removed from the spheres surface by agitation using jet sprayers 9 or the like where the solids are removed and enter into a solids trough 5 or the like.

The rare earth magnets 35 are strategically placed inside the settling spheres allowing for maximum attraction to the spheres' surface, yet weaker in the force needed to separate the spheres from each other. If the magnets were randomly placed inside the spheres, they would be pulled by their magnetic pull force to the sides of the spheres and be separated in distance by only the thickness of each sphere instead of the current way where each sphere's magnet is approximately the radius of the sphere from the sphere's surface. Also, the magnets can be randomly placed in the spheres, however the preferred embodiment is the strategic location in the center of the sphere. Also, the magnetic pull force of the spheres helps to attract and "move" the floc towards the spheres. This ensures a better chance or area to which the spheres can effectively attract the ferromagnetic floc.

The magnetite, because it has a specific gravity near 5, wants to settle and sink to the bottom of the tank. The floc tank system 20 is suitable to operably return the spheres back up to the surface of the tank, e.g., with agitation and/or mechanical interface. The spheres help return the magnetite back up to the surface with the use of an agitation system that includes a jet sprayer or the like. An agitation system is a preferred method but alternative methods are contemplated which would bring the spheres back up to the surface. The most preferred method is the spheres returning the magnetite to the surface of the tank without agitation, thus not risking the breaking of any bonds between the magnetite and the solids.

The spheres, with their rare earth magnet inside, help to reattach the magnetite to their surface after exiting the conduit. This allows for the eventual transfer of magnetite to the surface of the tank.

The spheres may first float then sink in the wastewater or the like or they may immediately sink, or constantly float. The preferred method is to float until enough ferromagnetic solids have collected on the sphere surface making their specific gravity greater than the water the spheres are in and thus, begin to settle downward. A predetermined weight may be strategically placed inside if necessary in order to sink the sphere after it captures ferromagnetic solids to its surface to make its specific gravity greater than water. If the surface of the sphere is saturated with ferromagnetic solids and a weight is not added to the sphere, the sphere's specific gravity may not be greater than the specific gravity of the water, in which case the sphere would not settle.

The jet sprayers or the like produce agitation in the water that helps remove some of the ferromagnetic solids from the spheres' surface. When enough of the ferromagnetic solids are removed from the spheres' surface so that the specific gravity of the spheres are now less than the water they are in, the spheres will start to rise in the water, eventually reaching the top to start the process again.

Removing much of the insoluble solids from the wastewater or the like with the spheres allows for the treatment of the wastewater, leachate or the like. Removing some of the solids in one tank makes it easier to treat the effluent water in the next tank of the floc tank system.

The vertical conduit pipe 6 helps keep the spheres in an area where they can rise to the surface of the tank or the like without bumping into the settling spheres outside of the conduit. Also, by being contained in the conduit, the spheres will be able to rise at a faster rate than if the conduit was not present, as the traffic of the settling spheres would impede the rising of the spheres, whose specific gravity became less than the water after the agitation removed some of the solids from their surface. Also, any ferromagnetic particles or just magnetite in the conduit will be recaptured by the spheres in the densely populated sphere area as they rise to the top. Because there are so many spheres rising and exiting at the surface, the conduit ensures little ferromagnetic particles will enter the conduit from the top and descend. The ferromagnetic particles entering the bottom of the conduit should be less than the average amount in the general tank area, but the magnetite only particles will be great. This is because the jet sprayers have broken the bonds between the magnetite and solids on the spheres' surface by agitation. The spheres thus recapture the heavy magnetite and return it to the surface. The spheres will rise even if they are saturated with magnetite only. If the surface of the sphere is saturated with just magnetite, the ferromagnetic particles (magnetite and solids) will still attach to the spheres and eventually cause its specific gravity to be greater than the water. However, when they settle in the tank near the jet sprayers, because of the agitation of the jet sprayers, the ferromagnetic solids have a difficult time staying attached to the spheres' surface as the spheres surface is saturated with just magnetite. The magnetic force of the spheres with just magnetite on them is much less than without.

The solids, magnetite and spheres are strategically directed over the sludge trough 5 by the spray from the jet sprayers.

The at least one ramp 113 and/or 4 helps to guide the spheres into the drum trough 118 and/or the conduit 6.

The magnetic drum 12 helps transfer the spheres from the surface of the water through the sink basin 29. If any magnetite or magnetite solids are in the sink basin, the spheres will recapture the magnetite and solids that have escaped past the drum and are headed for the effluent pipe 30 in the sink basin, and thus return them to the front of the tank surface.

The angled ledge 42 or ramp next to the drum helps to return the spheres to the front of the tank where they can begin the process. The preferred location for the spheres to be returned after exiting the drum by a scraper and rolling or sliding down the ramp is in the front surface of the tank, although the middle is an acceptable option.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A flash flocculation tank system, comprising:
   a first plurality of settling spheres having at least one rare earth magnet mounted within each settling sphere;
   a second plurality of settling spheres having at least one rare earth magnet mounted within each settling sphere, where said second plurality of settling spheres are the same as said first plurality of settling spheres or are different in their weight adjustment from said first plurality of settling spheres;
   a plurality of tanks including a first tank in fluid communication with at least a second tank and including a sixth tank in fluid communication with at least a fourth tank, where said first plurality of settling spheres are located in at least said second tank and said second plurality of spheres are located in at least said fourth tank, and where said second and fourth tanks are in fluid communication with one another;

at least one mixing device provided in at least said first tank, where at least a coagulant, a cationic polymer, a anionic polymer, and magnetite are mixed in said leachate causing insoluble solids of said leachate to become ferromagnetic solids such that when said leachate enters at least said second tank said ferromagnetic solids and magnetite affix to the surface of said first plurality of settling spheres causing said first plurality of settling spheres to settle downward, and when said leachate further enters at least said fourth tank said ferromagnetic solids and magnetite affix to the surface of said second plurality of settling spheres causing said second plurality of settling spheres to settle downward;

at least two sludge troughs each operably coupled to at least said second tank and fourth tank for removing said insoluble solids from the bottom of said second tank and fourth tank;

at least two agitation devices each located within at least said second tank and fourth tank to remove said solids from the surface of said first plurality of settling spheres and from said second plurality of settling spheres allowing said first and second plurality of settling spheres to operably return with said magnetite back to the surface of said second tank and fourth tank, respectively, via a fluid medium and to direct said removed insoluble solids toward said sludge troughs for removal from said second tank and fourth tank, respectively;

at least one magnetic drum operably coupled to said sixth tank for returning said second plurality of spheres mixed in said leachate entering said sixth tank to said fourth tank; and a second pipe in fluid communication with said sixth tank such that effluent exits said sixth tank through said second.

2. The flash flocculation tank system of claim 1, wherein said at least one agitation device is a jet sprayer and said plurality of settling spheres are removed from the surface of said first and second plurality of settling spheres by spray from said jet sprayer and are directed toward respective one of said sludge troughs.

3. The flash flocculation tank system of claim 1, wherein said fluid medium conduit is operably mounted within at least said second tank operable to provide a pathway for said first plurality of settling spheres and magnetite to return from the bottom of at least said second tank to the top surface of at least said second tank where additional ferromagnetic solids will become affixed to the surface of said first plurality of settling spheres.

4. The flash flocculation tank system of claim 3, wherein another of said fluid medium conduit is operably mounted within at least said fourth tank operable to provide a pathway for said second plurality of settling spheres to rise from the bottom of said fourth tank, since enough insoluble solids have been removed from said surface of said spheres, to the top surface of said fourth tank where additional ferromagnetic solids will become affixed to the surface of said second plurality of settling spheres.

5. The flash flocculation tank system of claim 1, wherein said fluid medium conduit is a fourteen inch pipe diameter duct pipe of polyvinyl chloride and is vertically positioned and generally centrally located within at least said second tank.

6. The flash flocculation tank system of claim 1, wherein said magnetite affixes to the surface of said first and second plurality of settling spheres and when enough ferromagnetic solids affix to said plurality of settling spheres, the specific gravity becomes greater than the leachate in which said plurality of settling spheres are suspended causing said plurality of settling spheres to settle toward the bottom of at least said second and fourth tanks.

7. The flash flocculation tank system of claim 1, wherein said first and second plurality of settling spheres have a predetermined magnetic pull force to reattach said magnetite to the surface of said plurality of settling spheres after exiting a fluid medium conduit to allow for the eventual transfer of said magnetite to the surface of at least said second and/or fourth tanks.

8. The flash flocculation tank system of claim 1, wherein said rare earth magnet of said first and/or second plurality of spheres is Neodymium with a pull force grade of N42 to help attract and move floc towards the surface of said plurality of spheres.

9. The flash flocculation tank system of claim 1, wherein said rare earth magnet is centrally mounted using a housing within said first and second plurality of settling spheres.

10. The flash flocculation tank system of claim 1, wherein said first and second plurality of settling spheres are each operably openable and resealable to selectively allow removal or addition of rare earth magnet weight to increase or decrease the desired predetermined weight of said first and/or second plurality of settling spheres suitable for particular applications.

11. The flash flocculation tank system of claim 1, wherein said flash flocculation tank system further comprises a third tank identical to said second tank and in fluid communication with said first tank, and a fifth tank identical to said fourth tank and in fluid communication with said third tank and said sixth tank, wherein said fourth and fifth tanks additionally have conduits to deliver sodium aluminate, as a coagulant, additional cationic polymer and anionic polymer to the fourth and fifth tanks.

12. The flash flocculation tank system of claim 1, wherein said flash flocculation tank system is operably mounted inside a shipping container of predetermined smaller size.

13. A flash flocculation tank system for treating landfill leachate, comprising:

a first tank provided with at least one mixing device and operable to receive leachate at a predetermined rate, where predetermined amounts of at least a coagulant, a cationic polymer, a anionic polymer, and magnetite are mixed in the leachate with the mixing device to reduce the mostly negative charges of the dissolved solids ions of the leachate and cause insoluble solids of the leachate to become ferromagnetic solids;

a first plurality of settling spheres with at least one rare earth magnet centrally mounted using a housing within each settling sphere and having a predetermined magnetic pull force to reattach magnetite to the surface of said first plurality of settling spheres;

a second tank and/or third tank in fluid communication with said first tank and operable for further treating said leachate delivered from said first tank, said second and/or third tank including said first plurality of settling spheres, where said ferromagnetic solids and magnetite affix to the surface of said first plurality of settling spheres causing said first plurality of settling spheres to settle toward the bottom of said second and/or third tank where said ferromagnetic solids are operably removed allowing said first plurality of settling spheres to operably return with said magnetite back to the surface of said second and/or third tank;

a second plurality of settling spheres with said at least one rare earth magnet centrally mounted using a housing within each settling sphere and having a predetermined magnetic pull force to reattach said magnetite to the surface of said second plurality of settling spheres;

a fourth tank and/or fifth tank in fluid communication with said second and/or third tank and operable for further treating said leachate delivered from said second and/or third tank, said fourth and/or fifth tank including said second plurality of settling spheres, where said magnetite and said ferromagnetic solids affix to the surface of said second plurality of settling spheres such that when the specific gravity becomes greater than the leachate, the second plurality of settling spheres settle toward the bottom of said fourth and/or fifth tank where said ferromagnetic solids are operably removed allowing said second plurality of settling spheres to operably return via a fluid medium conduit within each tank with said magnetite back to the surface of said second and/or third tank;

at least one agitation device located within said second tank and/or third tank and within said fourth tank and/or fifth tank to remove said solids from the surface of said first and second plurality of settling spheres;

at least one sludge trough operably each coupled to said second tank and/or third tank and to said fourth tank and/or fifth tank for removing said insoluble solids from the bottom of each respective tank;

a sixth tank in fluid communication with said fourth and/or fifth tank, where said leachate with said second plurality of settling spheres exit said fourth and/or fifth tank and said second plurality of settling spheres are immediately affixed to at least one magnetic drum rotatably coupled to said sixth tank to return said second plurality of settling spheres to said fourth and/or fifth tank;

a sink portion within said sixth tank to recapture any lost magnetite; and a second pipe in fluid communication with said sink portion such that effluent exits said sixth tank through said second pipe to the environment.

14. The flash flocculation tank system of claim 13, wherein said flash flocculation tank system includes said second tank, third tank, fourth tank and fifth tank, where said third tank is identical to said second tank and said fifth tank is identical to said fourth tank, and wherein said second tank is in fluid communication with said first tank via an influent pipe, said third is in fluid communication with said first tank view an influent pipe, and said fifth tank is in fluid communication with said third tank and said sixth tank, and said fourth tank is in fluid communication with said second tank and said sixth tank.

15. The flash flocculation tank system of claim 14, wherein said flash flocculation tank system is operably mounted inside a twenty foot high cube shipping container.

16. The flash flocculation tank system of claim 14, wherein said at least one agitation device is a jet sprayer and said plurality of settling spheres are removed from the surface of said first and second plurality of settling spheres by spray from said jet sprayer and are directed toward respective one of said sludge troughs.

17. The flash flocculation tank system of claim 14, wherein said second tank, third tank, fourth tank and fifth tank each have of a fluid medium conduit operably mounted within respective tanks operable to provide a pathway for said first and second plurality of settling spheres and magnetite to return from the bottom of respective tanks to the top surface of the respective tanks where additional ferromagnetic solids will become affixed to the surface of said first and second plurality of settling spheres, respectively.

18. The flash flocculation tank system of claim 14, wherein said first and second plurality of settling spheres are each operably openable and resealable to selectively allow removal or addition of rare earth magnet weight to increase or decrease the desired predetermined weight of said first and/or second plurality of settling spheres suitable for particular applications.

19. A method for treating leachate in a flash flocculation tank system, comprising:

providing a flash flocculation tank system operably mounted inside a shipping container, said flash flocculation tank system comprising a first tank having at least one mixing device, a second tank and/or third tank having/each having a fluid medium and an influent in fluid communication with said first tank for the delivery of leachate, a fourth tank and/or fifth tank having/each having another of said fluid medium and is/are in fluid communication with a respective effluent of said second tank and/or third tank for the delivery of leachate, and a sixth tank having at least one magnetic drum operably rotatably mounted to said sixth tank;

providing a first plurality of settling spheres in said second tank and/or third tank, said first plurality of settling spheres including at least one rare earth magnet centrally mounted using a housing within each settling sphere and having a predetermined magnetic pull force to reattach magnetite to the surface of said first plurality of settling spheres;

providing a second plurality of settling spheres in said third tank and/or fourth tank, said second plurality of settling spheres including at least one rare earth magnet centrally mounted using a housing within each settling sphere and having a predetermined magnetic pull force to reattach said magnetite to the surface of said second plurality of settling spheres, where said second plurality of settling spheres are the same as said first plurality of settling spheres or are different in at least their weight adjustment from said first plurality of settling spheres;

treating said leachate with aeration and biological treatments;

delivering aeration and biological treated leachate into said first tank at a predetermined rate;

adding predetermined amounts of poly aluminum chloride, cationic polymer, anionic polymer, and magnetite to the leachate in the first tank and mixing the leachate in the first tank with the at least one mixing device to chemically treat the leachate to precipitate some, but not all, of dissolved ions solids of the leachate and cause insoluble solids to become ferromagnetic solids, where said first, fourth tank and/or fifth tanks additionally have conduits to deliver a coagulant, cationic polymer and anionic polymer;

delivering said chemically treated leachate to said second tank and/or third tank where solids which have been chemically treated in said first tank stick together and affix to the surface of said first plurality of settling spheres causing said spheres to sink downward in said second and/or third tank;

applying spray at a predetermined rate from at least one jet sprayer located toward the bottom of said second and/or third tanks to direct said first plurality of settling spheres toward an area below said fluid medium and to remove said solids from the surface of the spheres allowing said first plurality of settling spheres to rise through a pathway of said fluid medium to the surface of the second and/or third tank;

removing said insoluble solids through at least one sludge trough;

delivering leachate to said fourth tank and/or fifth tank and further chemically treating said leachate with predetermined amounts of sodium aluminate, as a coagulant, additional cationic polymer and anionic polymer to the fourth and/or fifth tanks, said solids which have been chemically treated affix to the surface of said second plurality of settling spheres causing said spheres to sink downward in said fourth and/or fifth tank;

applying spray at a predetermined rate from at least one jet sprayer located toward the bottom of said fourth and/or fifth tank to direct said first plurality of settling spheres toward an area below said fluid medium and to remove said solids from the surface of the spheres allowing said second plurality of settling spheres to rise through a pathway of said fluid medium to the surface of the fourth and/or fifth tank;

removing said insoluble solids through at least one sludge trough in the bottom of said fourth and/or fifth tank;

delivering leachate to said sixth tank from said fourth and/or fifth tank where said second plurality of settling spheres immediately affix to said at least one magnetic drum and said magnetic drum rotates for the recapturing of any lost magnetite in a sink portion within said sixth tank, and as said magnetic drum continues to rotate to a predetermined position, the second plurality of settling spheres are operably released and delivered back to said fourth and/or fifth tanks; and removing effluent from said flash flocculation tank system via a second that is in fluid communication with said sink portion.

20. The flash flocculation tank system of claim 19, further comprising providing at least two ramps operably mounted on opposing sides of said fluid medium conduit to assist in guiding said first and second plurality of settling spheres toward respective said fluid medium conduit.

\* \* \* \* \*